United States Patent [19]

Nishida

[11] Patent Number: 4,718,006
[45] Date of Patent: Jan. 5, 1988

[54] DATA PROCESSOR SYSTEM HAVING IMPROVED DATA THROUGHPUT IN A MULTIPROCESSOR SYSTEM

[75] Inventor: Hidehiko Nishida, Tokyo, Japan

[73] Assignee: Fujitsu Limited, Kawasaki, Japan

[21] Appl. No.: 682,316

[22] Filed: Dec. 17, 1984

[30] Foreign Application Priority Data

Dec. 26, 1983 [JP] Japan .................. 58-247391
Dec. 27, 1983 [JP] Japan .................. 58-251923
Feb. 25, 1984 [JP] Japan .................. 59-34964

[51] Int. Cl.⁴ .............................. G06F 13/00
[52] U.S. Cl. ................................ 364/200
[58] Field of Search ...................... 364/200, 900

[56] References Cited

U.S. PATENT DOCUMENTS

| | | | |
|---|---|---|---|
| 4,219,873 | 8/1980 | Kober et al. | 364/200 |
| 4,257,099 | 3/1981 | Appelt | 364/200 |
| 4,342,083 | 7/1982 | Freedman et al. | 364/200 |
| 4,400,771 | 8/1983 | Suzuki et al. | 364/200 |
| 4,422,142 | 12/1983 | Inaba et al. | 364/200 |
| 4,453,216 | 6/1984 | Chiba et al. | 364/200 |
| 4,473,878 | 9/1984 | Zolnowsky et al. | 364/200 |
| 4,495,567 | 1/1985 | Treen | 364/200 |

FOREIGN PATENT DOCUMENTS

| | | | |
|---|---|---|---|
| 33-15699 | 12/1958 | Japan | 364/200 |
| 33-15697 | 12/1958 | Japan | 364/200 |
| 34-034964 | 2/1959 | Japan | 364/200 |
| 58247391 | 12/1959 | Japan | 364/200 |
| 58251923 | 5/1961 | Japan | 364/200 |
| 60-55859 | 12/1985 | Japan | 364/200 |
| 614134 | 2/1986 | Japan | 364/200 |

Primary Examiner—Thomas M. Heckler
Assistant Examiner—V. Nguyen
Attorney, Agent, or Firm—Staas & Halsey

[57] ABSTRACT

A data processor system includes a plurality of multiprocessor systems, and each multiprocessor system is connected through each memory control unit of each multiprocessor system. Each multiprocessor system comprises a memory control unit, at least one central processing unit, at least one channel control unit, and at least one main memory unit. The central processing unit, channel control unit, and main memory unit are connected to the memory control unit via interface lines. The memory control unit comprises at least two pipelines and at least two access requests to the main memory unit belonging to the pipe-line, and the other pipe-line is used for access requests to another main memory unit belonging to another memory control unit.

13 Claims, 10 Drawing Figures

DATA PROCESSOR SYSTEM HAVING IMPROVED DATA THROUGHPUT IN A MULTIPROCESSOR SYSTEM

BACKGROUND OF THE INVENTION

1. Field of the Invention

The present invention relates to a data processor system, more particularly, to a multiprocessor system used in a data processor system.

2. Description of the Related Art

As is well known, the data processor system used in a computer system comprises a plurality of multiprocessor systems, each which comprises a plurality of central processing units, channel control units and main memory units, and a memory control unit. The central processing units and the channel control units are connected to the main memory unit through the memory control unit by interface lines.

In the conventional data processor system, when improving the data throughput, only the number of central processing units connected to the memory control unit is increased for processing a large amount of data in the multiprocessor system. However, the number of central processing units that can be connected to the memory control unit is limited, due to limits on and system expansion at a customer's office.

SUMMARY OF THE INVENTION

An object of the present invention is to provide a data processor system comprising a plurality of multiprocessor systems.

Another object of the present invention is to provide a multiprocessor system having reduced interface hardware, such as connectors and cables, and allowing high density construction.

Another object of the present invention is to provide a multiprocessor system allowing improved data throughput in the system.

Still another object of the present invention is to provide a multiprocessor system allowing effective and high speed access control for mutual data transmission.

In accordance with the present invention, there is provided a data processor system including a plurality of multiprocessor systems, in which each multiprocessor system is connected through each memory control unit of each multiprocessor system. The multiprocessor system comprises, a memory control unit connected to the other multiprocessor systems through interface lines used for data transmission, with at least one central processing unit connected to the memory control unit, at least one channel control unit connected to the memory contol unit, and at least one main memory unit connected to the memory control unit; the central processing unit, channel control unit, and main memory unit being connected to each other through the memory control unit by using interface lines for data transmission. The basic operation of the multiprocessor system is summarized below.

When the central processing unit requests access to the main memory unit in the first multiprocessor system for reading out the data stored in the main memory unit, first, an access request signal generated by the central processing unit is transmitted to the memory control unit, second, the memory control unit accesses the main memory unit, third, the main memory unit reads out and transmits the data to the memory control unit, and fourth, the memory control unit transmits the data to the central processing unit.

When the same central processing unit in the first multiprocessor system requests access to the main memory unit in the second multiprocessor system for reading out the data stored in the second main memory unit, first, an access request signal generated by the central processing unit is transmitted to the memory control unit in the first multiprocessor system, second, the memory control unit in the first multiprocessor system accesses the memory control unit in the second multiprocessor system, third, the second memory control unit accesses the main memory unit in the second multiprocessor system, fourth, the main memory unit reads out and transmits the data to the second memory control unit, fifth, the second memory control unit then transmits the data to the memory control unit in the first multiprocessor system, and sixth, the first memory control unit transmits the data to the central processing unit in the first multiprocessor system. Each memory control unit comprises a first pipe-line for controlling access request signals for the main memory unit connected to the memory control unit belonging to the first pipe-line, a second pipe-line for controlling access request signals for another main memory unit belonging to another memory control unit, a first access selecting circuit for selecting an access request signal depending on whether it is to access the main memory unit belonging to the first memory control unit or to another main memory unit belonging to another memory control unit, and a second access selecting circuit for selecting an access request signal to another main memory unit belonging to another memory control unit.

There is also provided a method for processing data in a memory control unit provided in a multiprocessor system, this method comprising the steps of selecting access request signals generated by a central processing unit depending on whether they are for a main memory unit belonging to the central processing unit or for a main memory unit belonging to another memory control unit, then transmitting the selected access request signals when accessing another main memory unit belonging to another memory control unit, and processing both access request signals transmitted from the central processing unit and another memory control unit based on the priority ranking of the requests.

Thus, in accordance with the structure and method of the present invention, it is possible to improve access control routes in the memory control unit, thereby improving data throughput in the data processor system.

DESCRIPTION OF THE PREFERRED EMBODIMENTS

Before describing the preferred embodiments, an explanation will be given of the conventional data processor system shown in FIG. 1A.

Figure 1A:
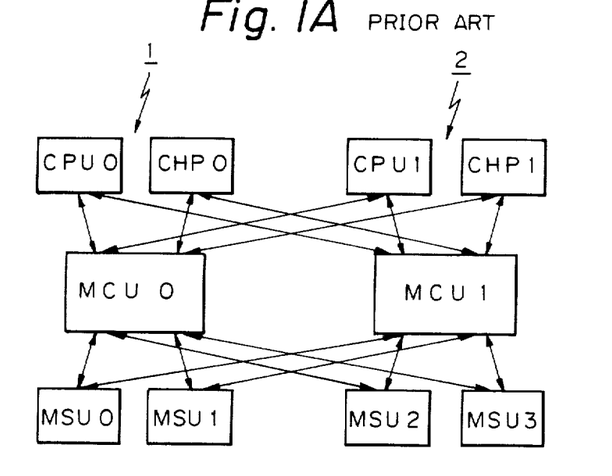
FIG. 1A is a schematic block diagram of a conventional data processor system consisting of two multiprocessor systems.

In FIG. 1A, although a data processor system generally consists of a plurality of multiprocessor systems, the data processor system in this example consists of two multiprocessor systems i.e., a first multiprocessor system 1 and a second multiprocessor system 2, to facilitate explanation of the prior art.

The first multiprocessor system 1 comprises a central processing unit CPU0, a channel control unit CHP0, two main memory units MSU0 and MSU1, and a memory control unit MCU0. The second multiprocessor system 2 comprises the same construction as the first multiprocessor system 1. As is obvious from the drawing, each CPU is connected to both MCU0 and MCU1, and each CHP is also connected to both MCU0 and MCU1. Moreover, each MCU is connected to the MSU's i.e., MSU0 to MSU3. These connections in the multiprocessor system have the advantage of providing general access to the MSU's, since each CPU can access any MSU through any MCU. Accordingly, when one MCU is out of order, another MCU can be used instead of the MCU that is out of order.

However, it is necessary to provide an interface port for each unit, and thus the number of interface lines and interface ports are drastically increased, and, as a result, all hardware for the interface ports necessarily becomes larger.

Moreover, it is necessary to provide a connector for each interface line, so that the space factor associated with each integrated circuit becomes more complicated.

A data processor system according to the present invention will be explained below.

Figure 1B:
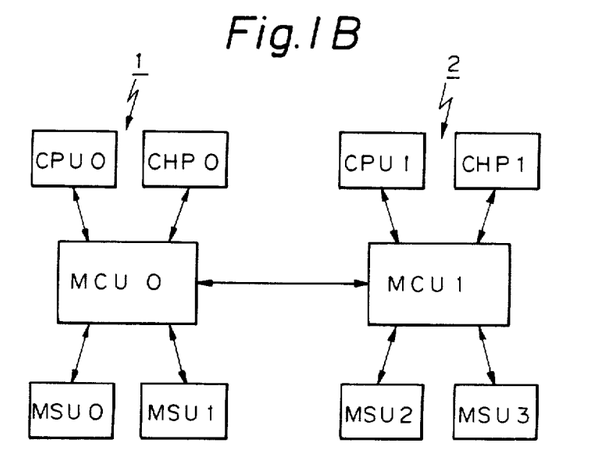
FIGS. 1B to 1C are schematic block diagrams of a data processor system according to the present invention.

In FIG. 1B, the first multiprocessor system 1 comprises a central processing unit CPU0, a channel control unit CHP0, two main memory units MSU0 and MSU1, and a memory control unit MCU0. The difference between the system shown in FIG. 1A and that in FIG. 1B is the method used for connection to the second multiprocessor system.

Figure 1C:
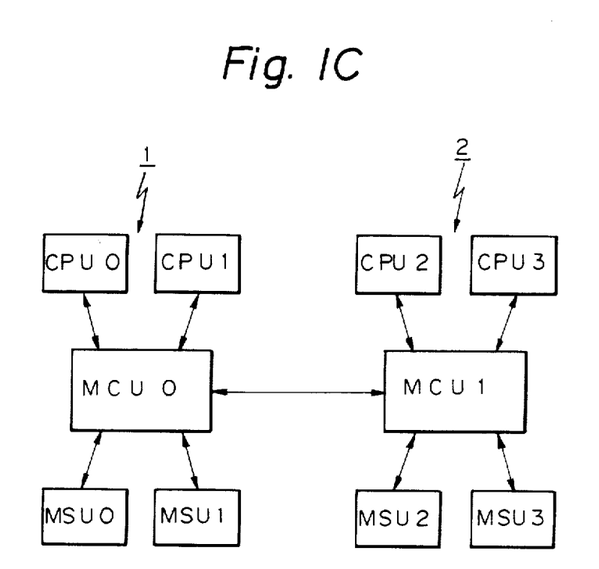

In FIG. 1C, the first multiprocessor system comprises two central processing units CPU0 and CPU1, two main memorys units MSU0 and MSU1, and a memory control unit MCU0. As is obvious from the drawings, the second multiprocessor system has the same construction as the first system.

Before describing the preferred embodiments, an explanation will be given of the basic memory control unit shown in FIGS. 2 to 4 by refering to FIGS. 1B to 1C.

In FIGS. 1B to 1C, the basic processing procedure is performed in accordance with the following steps.

When the CPU0 requests access to the MSU0 in the first system 1 for reading out the data stored in the MSU0 (called a "fetch request"), first, an access request signal generated by the CPU0 is transmitted to the MCU0, second, the MCU0 accesses the MSU0, third, the MSU0 reads out and transmits the data to the MCU0, and fourth, the MCU0 transmits the data to the CPU0.

Meanwhile, when the same central processing unit CPU0 requests access to the MSU2 in the second system 2 for reading out the data stored in the MSU2 (also using a "fetch request"), first, an access request signal generated by the CPU0 is transmitted to the MCU0, second, the MCU0 transmits the signal to the MCU1, third, the MCU1 accesses the MSU2, fourth, the MSU2 reads out and transmits the data to the MCU1, fifth, the MCU1 transmits the data to the MCU0, and sixth, the MCU0 transmits the data to the CPU0.

When the CPU0 requests access to the MSU0 for reading out and transmitting the data stored in the MSU0 to the CHP0, an access request signal generated by the CPU0 is transmitted to the MCU0, the MCU0 accesses the MSU0, the MSU0 reads out and transmits the data to the MCU0, and the MCU0 transmits the data to the CHP0 as shown in FIG. 1B.

As can be understood from the drawings, the number of interface lines connected between the CPU and the MCU, between the MCU and the MSU, between the MCU of the first system and the MCU of the second system, and between the MCU and the CHP shown in FIGS. 1B and 1C, are reduced as compared to the interface lines shown in FIG. 1A. Accordingly, connections between systems as shown in FIGS. 1B and 1C are used in the data processor system according to the present invention.

Figure 2:
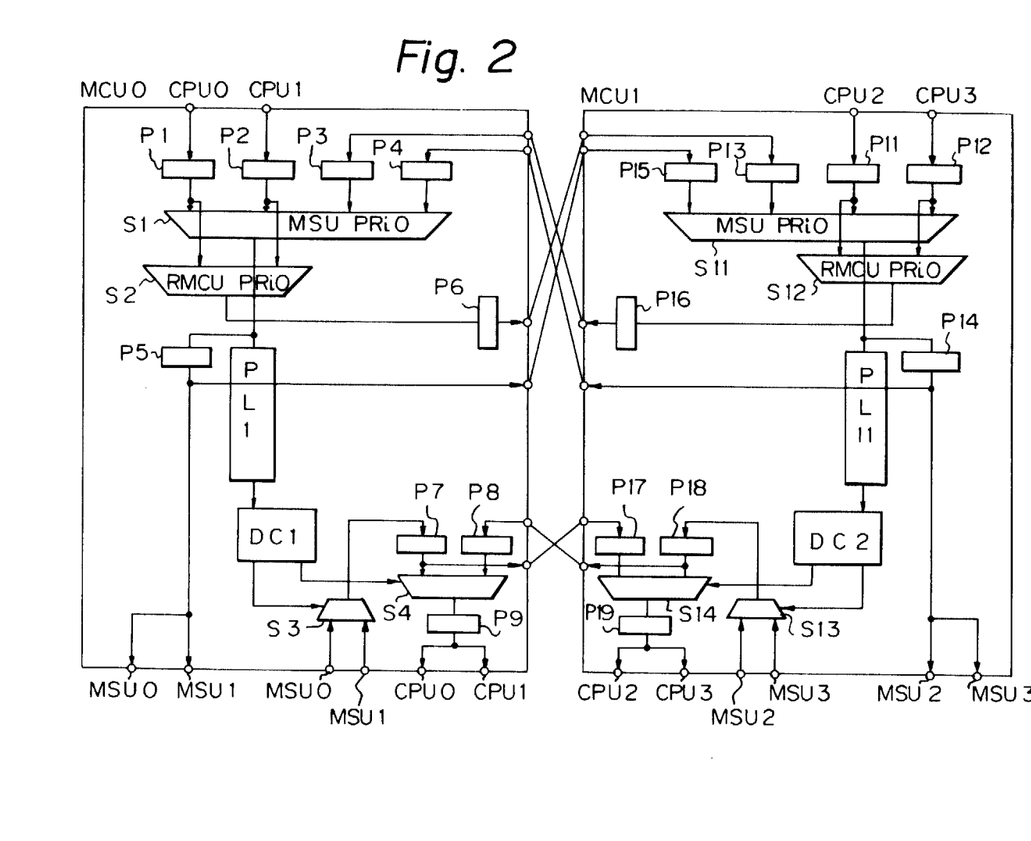
FIG. 2 is a basic block diagram of a memory control unit explaining the present invention.

In FIG. 2, P represents a port, S an access selecting circuit (selector), PL a pipe-line, and DC a control unit. Numerals 1, 2, ... are suffixed P, S, PL, and DC to distinguish each component.

The MCU0 and MCU1 are both controlled by a so-called pipe-line control. The processing procedure by the MCU is explained below.

1. An access request signal generated by the CPU0 is transmitted to the port P1 (which functions as an interface register) in the MCU0;

2. The received access request signal is selected by the selector (remote MCU priority circuit) S2 which selects the access request signal to be transmitted to the MCU1, and the selected access request signal is transmitted to the MCU1 via the port P6. The MCU0 and the MCU1 are connected by a plurality of interface lines, and thus the access signal is transmitted to the port P13 in the MCU1;

3. The received access request signal is selected by the selector (MSU priority circuit) S11 which selects the access request signals to be transmitted to the MSU2, the selected access request signal is transmitted to the port P14 and the PL11, and to the MSU2 via the port P14. The MSU2 then reads out the data based on the access request signal and transmits the read data to the selector S13;

4. At the same time, the access request signal is transmitted to the port P4 in the MCU0 via the port P14, and, as a result, the MCU0 recognizes that the MSU2 has been accessed by the MCU1. The selector S1 receives the access request signal from the port P4 with a first priority, and transmits the access request signal to the PL1. This access signal is stored in the PL1 while waiting for the data to be transmitted from the MSU2. Although the data read out by the MSU2 is transmitted to the selector S13, the timing for the reading out is controlled based on the access request signal stored in the PL11, and the PL11 commands the selector S13 to select the data read out of the MSU2 via the control unit DC2. As is well known, the pipeline is comprised of plural stages of registers which are serially connected, and the control data is shifted through these registers synchronously by a clock signal. Therefore, the selection at the selector S13 can be controlled by shifting the access request signal through the specific number of register stages which correspond to the access time of the memory units. The selected read out data is transmitted to the port P8 in the MCU0 via the port P18;

5. Meanwhile, since the timing of the reading out has been recognized based on the access request signal stored in the PL1, the PL1 commands the selector S4 to select the data of the port P8 via the control unit DC1;

6. The read out data selected by the selector S4 from the MSU2 is transmitted to the CPU0 via the port P9.

As explained above, in the processing procedures, the MCU0 uses the pipe-line PL1 for processing not only the data in the first system, but also the data from the MCU1 to the CPU0, and the MCU1 uses the pipe-line PL11 for processing not only the data in the second system, but also the data from the MSU2 to the MCU0. In case of an access from CPU2 to MSU1, for example, a similar operation, in reverse, is carried out. This means that the pipe-line PL1 and PL11 are used for transmitting the access request signal and the data to the other multiprocessor system respectively. Since the pipe-line PL1 is used for the first system 1 and the second system 2, if the first priority access request signal transmitted from the second system 2 has been already received at the PL1, the other access request signal to be accessed to, for example, the MSU0 belonging to the first system 1, must be held by the selector S1.

Accordingly, the access request signal to be accessed independently without influence by the other access request signal transmitted from the other system is nevertheless influenced by the other system, so that the access request signal in the selector must be held for a time, and this results in a reduced data throughput in the data processor system.

Figure 3:
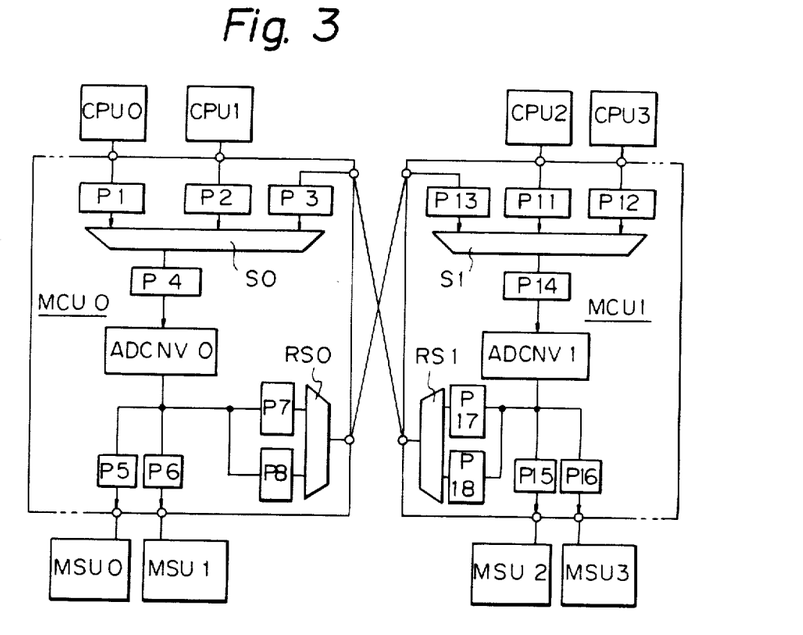
FIG. 3 is a partial block diagram of a memory control unit for explaining the present invention.
Figure 4:
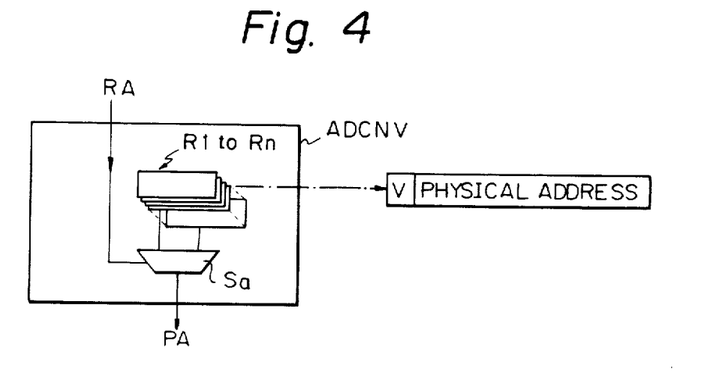
FIG. 4 is an address converter for explaining the present invention.

Another drawback of this system, which only employs MCU's having additional interface between the other MCU's, is explained briefly with respect to FIGS. 3 and 4.

In FIG. 3, ADCNV represents an address converter which converts a real address to a physical address. As explained in FIG. 2, when the CPU0 requests access to the MSU2 in the second system 2, the access request signal generated by the CPU0 is selected by the selector S0 via the port P1. The selected access request signal indicating the real address is converted to the physical address by the ADCNV0. Since the converted address (physical address) indicates the actual address in the MSU2, the converted address is transmitted to the selector (remote access selecting circuit) RS0, and transmitted to the port P13 in the MCU1. The converted address is selected by the selector S1 and not converted by the ADCNV1 (that is, since the address has already been converted by the ADCNV0, it is merely passed through the ADCNV1). The converted address is transmitted to the MSU2 via the port P15. If the access request signal indicates a "fetch request", i.e., the reading out the data from the MSU2, the MSU2 reads out and transmits the read out data to the CPU0 via the MCU1 and MCU0. In this processing procedure, both the access request signals generated by the CPU0 and the CPU2 are transmitted to the selector S0, and after selection by the selector S0 based on the highest priority is carried out, the selected access request signal is converted to the physical address.

Whether the selected access signal is for access to the MSU in the first system or the MSU in the second system, is determined at this step.

Accordingly if the access request signal accesses the MSU in the second system, the access signal is selected by the selector S0 before conversion by the ADCNV0, so that there are ineffective access request signal routes in the system, and this results in a reduced data throughput in the data processor system.

In FIG. 4, the real address RA is transmitted to the selector Sa, and the selector Sa selects the corresponding physical address from the registers RI to RN. The problems found in this conversion will be explained in detail wih respect to FIG. 8.

A multiprocessor system used in a data processor system according to another embodiment of the present invention will now be described. As can be understood from FIG. 5, a new pipe-line PL2 is added to the first multiprocessor system and a new PL12 is added to the second multiprocessor system at the first embodiment of the present invention. These pipe-lines PL2 and PL12 are used for access control for the other respective multiprocessor systems. With these pipe-lines, new selectors S4 and S14, new ports P9 and P19 are added to each system. Reference numerals 3 to 8 indicate interface lines.

Figure 5:
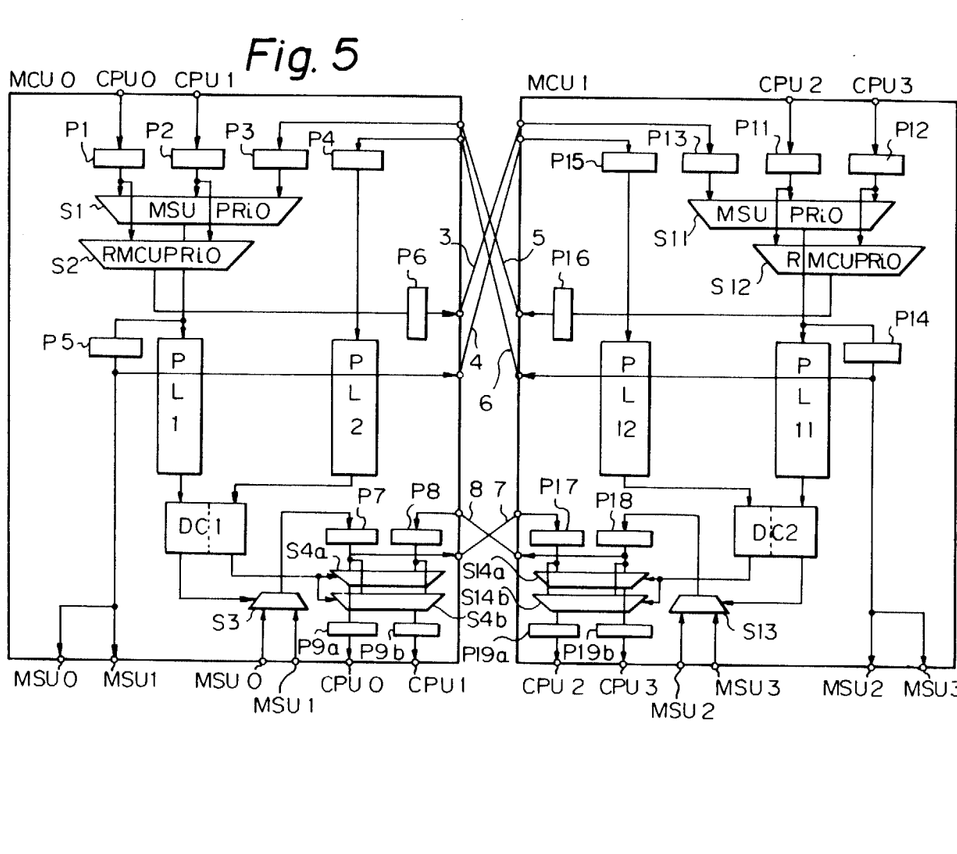
FIG. 5 is a schematic block diagram of a memory control unit according to one embodiment of the present invention.

The processing procedure for these memory control units is explained in detail below. When the CPU0 requests access to the MSU2 in the second system, 1. An access request signal generated by the CPU0 is transmitted to the port P1 (which functions as an interface resister) in the MCU0;

2. A received access request signal is selected by selector S2 which selects an access request signal to be transmitted to the MCU1 and transmits the selected access request signal to the MCU1 via the port P6. The selected access request signal is received by the port P13 in the MCU1;

3. In the MCU1, the received access request signal is selected by a selector S11 which selects the access request signal to be transmitted to the MSU2 and the selected access request signal is transmitted to the PL11 and to the MSU2 via the port P14. Moreover, the selected access request signal is transmitted to the pipe-line PL2 in the MCU0 via the port P14 and the port P4. When this access request signal is received through port P4, the MCU0 recognizes that the MCU2 has been accessed by the MCU1;

4. This access request signal stored in the PL2 has been held while waiting for the data transmitted from the MSU2 in the second system. The MSU2 reads out and transmits the data to the selector S13 based on the selected access request signal transmitted from the port P14. At the same time the access request signal stored in the PL11 is transmitted to the selector 13 to select the read out data of the MSU2 via the control unit DC2;

5. The selected read out data is transmitted to the port P8 in the MCU0 via the port P18;

6. Meanwhile, the access request signal waiting in the PL2 is transmitted to the control unit DC1 to select the data from the port P8. The read out data selected by the selector S4a from the MSU2 is transmitted to the CPU0 via the port P9a.

As explained above, in the processing procedure, since the MCU0 includes the pipe-line PL2 for processing the data transmitted from the other system, and the MCU1 comprises the pipe-line PL12 for processing the data transmitted from another system, each MCU no longer suffers from interference by the access request signal transmitted from the other system, and the access request signal, for example, for the MSU in one system need not be held in the selector.

Accordingly, the access request signal to be accessed independently without influence by the other access request signal transmitted from the other system is no longer influenced by the other system, so that the previously necessary holding time for the access request signal in the selector can be eliminated, resulting in an improved data throughput in the data processor system.

In this embodiment, although there are two memory control units used to facilitate the explanation, it is possible to connect a plurality of multiprocessor systems (n) through each memory control unit in the data processor system. In this case, the pipe-lines are provided in the multiprocessor system with one pipe-line for the first system, and pipe-lines (n−1) for the other systems.

Figure 6:
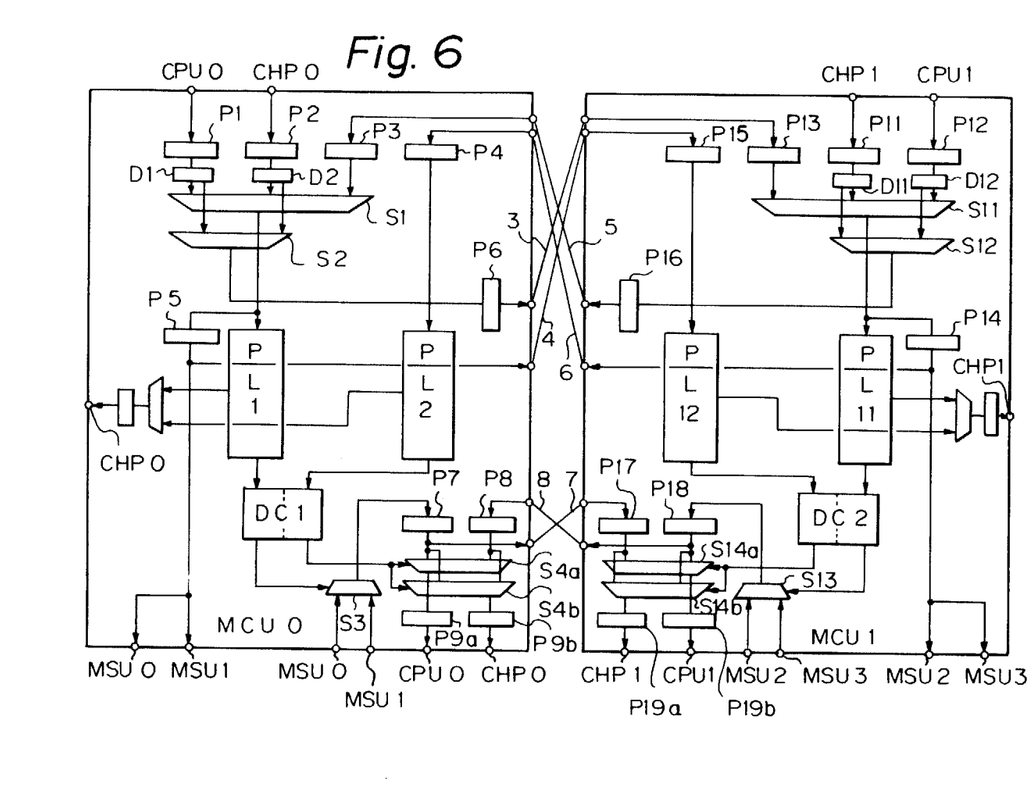
FIG. 6 is a schematic block diagram of a memory control unit according to another embodiment of the present invention.

In FIG. 6, discriminating circuits are added to the multiprocessor system. In this embodiment, the discriminating circuits D1 and D2 are added to the first multiprocessor system in FIG. 5 and D11 and D12 are added to the second multiprocessor system in FIG. 5.

In the MCU0, the discriminating circuits D1 and D2 are used for determine whether the access request signal transmitted from the CPU0 or CHP0 belongs to the MCU0 or to the MCU1, and for transmitting the discriminated access request signal to the selector S1 or the S2 after the discrimination. Moreover, the discriminators D1 and D2 process the synchronous transmission based on the access request signal to all systems and data transfer based on the access request signal to the CHP as the access request signal to the first system, and transmits the selected access request signal to the selector S1. As explained in FIG. 5, the selector S1 (MSU priority circuit) functions as an MSU priority circuit per se, and determines the priority of the access request signals transmitted from the CPU0, CHP0 and the other system to the CPU0, CHP0, MSU0 and MSU1 in the first system. The selected access request signal is transmitted to the PL1 and the port P5. Also, as explained in FIG. 5, the selector S2 functions as a remote MCU priority circuit, and determines the priority of the access request signals transmitted from the CPU0 and the CHP0 to the second system. The selected access request signal is transmitted to the MCU1 via the port P6. The procedures following are the same procedures as explained in FIG. 5.

Meanwhile, when the CPU0 synchronously transmits the data to the CHP0 and the CHP1, 1. The access request signal generated by the CPU0 is transmitted to the port P1;

2. The received access request signal is determines by the discriminating circuit D1 as a transmission to the MCU0 and transmitted to the selector S1. The access signal selected by the S1 with the first priority is transmitted to the PL1 and transmitted to the PL12 in the MCU1 via the port P5 and the port P6;

3. The data transmission to the CHP0 is used for the data in the address pipe-line based on the control of the pipe-line PL1;

4. The data transmission to the CHP1 is used for the data in the address pipe-line based on the control of the PL12.

Accordingly, the data transfer based on the access request to the CHP1 is performed without respect to the remote MCU priority circuit S2 and its own MCU priority circuit S11, so that the access request time can be reduced between the MCU0 and the MCU1.

Figure 7:
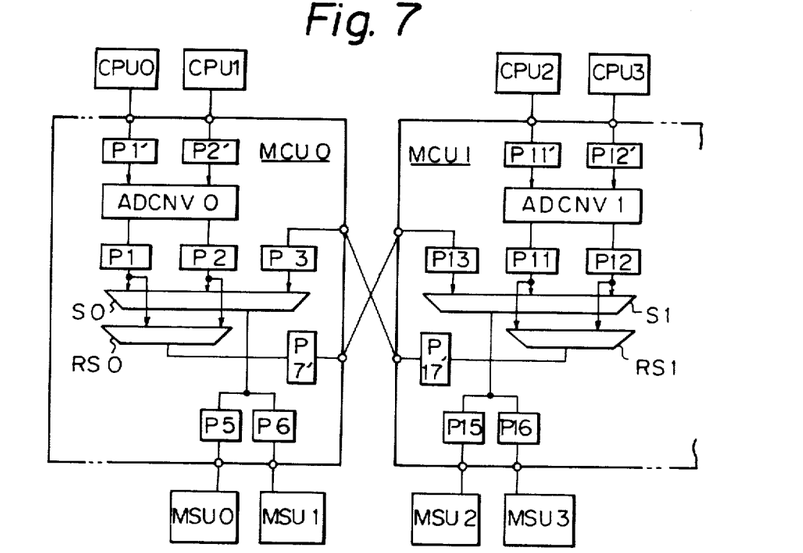
FIG. 7 is a partial schematic block diagram of a memory control unit according to still another embodiment of the present invention.

In FIG. 7, as explained in FIG. 3, ADCNV represents an address converter which converts a real address to a physical address. In this embodiment, as can be understood from the drawing, the ADCNV is located at a prior to the access selecting circuit (selector) different which is different from that of the ADCNV shown in FIG. 3.

Figure 8:
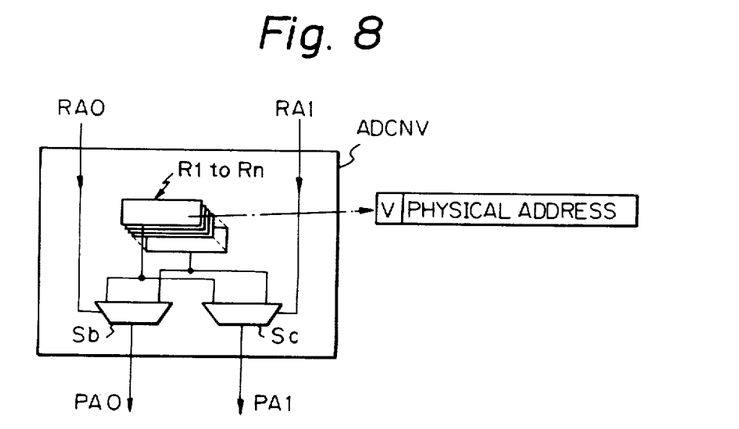
FIG. 8 is a schematic representation explaining an address converter shown in FIG. 7.

In FIG. 8, the ADCNV is basically comprises by a plurality of registers R1 to Rn and selectors Sb and Sc. The number of registers R1 to Rn provided correspond to the number memory chips. Each register stores the physical address indicating the physical address in the memory chip and a valid bit V indicating whether it is a valid physical address or an invalid physical address. The access request signals RA0 and RA1 having the real address are transmitted to the selector Sb and the selector Sc. The corresponding register is selected by the most significant few bits of the access request signal, and the physical address PA0 and PA1 stored in the register are read out through the selector Sb and Sc. The number of the selectors is determined by the corresponding number of the origin of the access request, namely processors such as CPU0 and CPU1.

The processing procedures of this embodiment are explained in detail with respect to FIGS. 7 and 8.

When the CPU0 requests access to the MSU2, the access request signal generated by the CPU is transmitted to the port P1′ and converted to the physical address by the ADCNV0; the converted access signal is transmitted to the port P1 and selected by the remote access selecting circuit RS0; the selected access request signal is transmitted to the access selecting circuit S1 in the MCU1 via the port P7′ and the port P13; the selected access request signal is transmitted to the MSU2 via the port 15; and the MSU2 reads out and transmits the data to the CPU0 via the MCU1 and the MCU0.

Accordingly, if the access request signal accesses the MSU in the second system, the access request signal is previously selected by the ADCNV, so that effective access request signal routes are provided in the system and this results in an improved data throughput in the data processor system.

What is claimed is:

1. A data processor system comprising a plurality of multiprocessor systems each having a memory control unit, each multiprocessor system being connected to the other multiprocessor systems through the memory control unit of each multiprocessor system, each said multiprocessor system comprising:

a memory control unit operatively connected to the other multiprocessor systems for data transmission therebetween;

at least one central processing unit operatively connected to said memory control unit; and at least one main memory unit operatively connected to said memory control unit and synchronously operated with said memory control unit and each central processing unit.

2. A data processor system as claimed in claim 1, wherein each said central processing unit sends access request signals and each said memory control unit includes:
  a first pipeline for controlling access request signals for the main memory unit connected to said memory control unit;
  a second pipeline for controlling access request signals for another main memory unit connected to another memory control unit;
  a first access selecting circuit for selecting an access request signal from access request signals from each central processing unit associated with said first access selecting circuit and from other multiprocessor systems to determine whether it is an access request to the main memory unit associated with said first access selecting circuit or another main memory unit associated with another memory control unit, sending the request to the first pipeline of the memory control unit associated with said first access selecting circuit, and duplicating and sending the request to the second pipeline of said another memory control unit; and
  a second access selecting circuit for selecting an access request signal from access request signals from each central processing unit associated with said second access selecting circuit and sending said request to another main memory unit associated with another memory control unit via the first access selecting circuit of said another memory control unit.

3. A data processor system as claimed in claim 2, wherein a number of said second pipelines provided is one less than the number of memory control units.

4. A data processor system as claimed in claim 2, wherein a number of said second access selecting circuits are provided which is the same number as the number of memory control units and each is associated with one of the memory control units.

5. A multiprocessor system as claimed in claim 2, wherein a number of said first access selecting circuits are provided which is the same number as the number of main memory units associated with the memory control unit and which are associated with each main memory unit.

6. A multiprocessor system as claimed in claim 2, wherein said memory control unit further includes an address converter for converting a real address generated by said central processing unit to a physical address and is connected to said central processing unit at a stage prior to said first and second access selecting circuits.

7. A multiprocessor system as claimed in claim 2, wherein said memory control unit further comprises a discriminating circuit for discriminating access request signals for synchronous data transmission to another multiprocessor system.

8. A method for processing data in a data processing system including a plurality of multiprocessor systems, each multiprocessor system having a memory control unit, said method comprising the steps of:
  selecting access request signals generated by a central processing unit depending upon whether they are for requesting access to a first main memory unit associated with said central processing unit or for a second main memory unit associated with a second memory control unit;
  transmitting the selected access request signal to the second main memory unit associated with the second memory control unit when the selected access request signal is directed to the second main memory unit; and
  processing both access request signals transmitted from said central processing unit and the second memory control unit based on a priority ranking.

9. A method as claimed in claim 8, wherein said memory control unit operates synchronously with the second memory control unit.

10. A processing system, comprising:
  a first multiprocessor system comprising a first processing unit, a first memory control unit operatively connected to said first processing unit and a first memory unit operatively connected to said first memory control unit;
  a second multiprocessor system comprising a second processing unit, a second memory control unit operatively connected to said second processing unit and said first memory control unit, and a second memory unit operatively connected to said second memory control unit;
  said first memory control unit comprising:
    first selecting and transmitting means, operatively connected to said first processing unit and said second memory control unit, for selecting memory access requests from said first processing unit directed to said second memory unit and transmitting the memory access requests to said second memory control unit;
    first access receiving means, operatively connected to said second memory control unit and said first memory unit, for accessing said first memory unit with memory access requests from said second memory control unit and from said first processing unit; and
    first data transfer means, operatively connected to said first access receiving means, said first memory unit, said first processing unit and said second memory control unit, for transferring data from said second memory unit to said second memory control unit and from said second memory control unit to said first processing unit in dependence upon the access request; and
  said second memory control unit comprising:
    a second selecting and transmitting means, operatively connected to said second memory unit and said first access receiving means, for selecting memory access requests from said second processing unit directed to said first processing unit and transmitting the memory access requests to said first access receiving means;
    second access receiving means, operatively connected to said first selecting and transmitting means and said second memory unit, for accessing said second memory unit with memory access requests from said first selecting and transmitting means and from said second processing unit; and
    second data transfer means, operatively connected to said second access receiving means, said second memory unit, said second processing unit and said first data transfer means, for transferring data from said first memory unit to said first data transfer means, from said first data transfer means to said second processing unit and from said second memory unit to said second processing unit.

11. A processing system as claimed in claim 10, wherein said first memory control unit further comprises a first pipe-line for holding memory access requests from the first processing unit directed to said first memory unit and said first access receiving means comprises a second pipe-line.

12. A data processor system as claimed in claim 1, wherein each said central processing unit sends access request signals and each said memory control unit includes:
- a first pipeline for controlling access request signals for the main memory unit connected to said memory control unit;
- a second pipeline for controlling access request signals for another main memory unit connected to another memory control unit;
- a first access selecting circuit for selecting a first access request signal from access request signals from each central processing unit connected to said memory control unit and from a second access selecting circuit in said other memory control unit, sending said first access request signal to the first pipeline in said memory control unit, and duplicating and sending said first access request signal to the second pipeline in said other memory control unit;
- a second access selecting circuit for selecting a second access request signal from access request signals from each central processing unit connected to said memory control unit and sending said second access request signal to the first selecting circuit in said other memory control unit; and
- a data selecting circuit for selecting read data from the main memory connected to said memory control unit and from the data selecting circuit in said other memory control unit, sending the read data to the central processing unit connected to said memory control unit, and duplicating and sending the read data to the data selecting circuit in said other memory control unit, according to outputs form the first and second pipelines.

13. A data processor system comprising:
first and second memory control units operatively connected to each other;
first processor connected to the first memory control unit;
second processor connected to the second memory control unit;
first main memory unit connected to the first memory control unit; and
second main memory unit connected to the second memory control unit, said first memory control unit comprising:
- first control means for receiving access requests from the first processor and from the second memory control unit, selecting a first access request for the first main memory unit, duplicating and sending said first access request to the second memory control unit and controlling data transfer between the first main memory unit and the first processor;
- second control means for receiving an access request from the first processor, discriminating access requests for the second main memory unit, and sending access requests for the second main memory unit to the second memory control unit; and
- third control means for receiving a duplicated access request, and for controlling data transfer between the first main memory unit and the second memory control unit; and said second memory control unit comprising:
- fourth control means for receiving access requests from the second processor and from the first memory control unit, selecting a second access request for the second main memory unit, duplicating and sending said second access request to the first memory control unit, and controlling data transfer between the second main memory unit and the second processor;
- fifth control means for receiving an access request from the second processor, discriminating access requests for first the first main memory unit, and sending access requests for the main memory unit to the first memory control unit; and
- sixth control means receiving a duplicated access request from the first control means, and controlling data transfer between the second main memory unit and the first memory control unit.

* * * * *

UNITED STATES PATENT AND TRADEMARK OFFICE
CERTIFICATE OF CORRECTION

PATENT NO. : 4,718,006

DATED : January 5, 1988

INVENTOR(S) : Nishida

Page 1 of 2

It is certified that error appears in the above-identified patent and that said Letters Patent is hereby corrected as shown below:

FRONT PAGE
[56] Foreign Patent Documents
"34-034964" should be --59-034964--.

Col. 1, line 27, delete "and".

Col. 3, line 65, "refering" should be --referring--.

Col. 5, line 30, "pipe-line" should be --pipe-lines--.

Col. 6, line 26, after "new" insert --pipe-line--.

Col. 7, line 60, "determines" should be --determined--.

Col. 8, line 6, "MCU" (second occurrence) should be --MSU--;

Col. 8, line 13, after "a" insert --stage--;

Col. 8, line 16, delete "by".

Col. 11, line 39, "form" should be --from--.

UNITED STATES PATENT AND TRADEMARK OFFICE
CERTIFICATE OF CORRECTION

PATENT NO. : 4,718,006
DATED : January 5, 1988
INVENTOR(S) : Hidehiko Nishida

Page 2 of 2

It is certified that error appears in the above-identified patent and that said Letters Patent is hereby corrected as shown below:

Col. 12, line 37, delete "first" (first occurrence).

Signed and Sealed this

Nineteenth Day of July, 1988

Attest:

DONALD J. QUIGG

Attesting Officer       Commissioner of Patents and Trademarks